US012157600B2

(12) United States Patent
Kennedy et al.

(10) Patent No.: US 12,157,600 B2
(45) Date of Patent: Dec. 3, 2024

(54) POSITIONING DEVICE AND METHOD FOR VEHICLE STICKERS

(71) Applicant: Inspection Purpose, LLC, West Pittston, PA (US)

(72) Inventors: Kevin Kennedy, West Pittston, PA (US); Joseph Maryovich, Exeter, PA (US)

(73) Assignee: Inspection Purpose, LLC, West Pittston, PA (US)

( * ) Notice: Subject to any disclaimer, the term of this patent is extended or adjusted under 35 U.S.C. 154(b) by 25 days.

(21) Appl. No.: 17/858,956

(22) Filed: Jul. 6, 2022

(65) Prior Publication Data

US 2023/0009589 A1 Jan. 12, 2023

Related U.S. Application Data

(60) Provisional application No. 63/218,627, filed on Jul. 6, 2021.

(51) Int. Cl.
*B65C 9/26* (2006.01)

(52) U.S. Cl.
CPC .................................... *B65C 9/262* (2013.01)

(58) Field of Classification Search
CPC ........................ B65C 9/262; G09F 2007/1865
See application file for complete search history.

(56) References Cited

U.S. PATENT DOCUMENTS

| | | | | | |
|---|---|---|---|---|---|
| 4,690,724 | A * | 9/1987 | Outlaw | B29C 63/0013 219/229 |
| 6,178,584 | B1 * | 1/2001 | Post | A47L 13/20 15/232 |
| 2005/0034260 | A1 * | 2/2005 | Post | A47L 13/20 15/232 |
| 2005/0180807 | A1 * | 8/2005 | Walsh, III | A47L 1/15 401/196 |
| 2011/0253297 | A1 * | 10/2011 | O'Keefe | B42D 5/027 428/32.22 |

* cited by examiner

*Primary Examiner* — Gary C Hoge
(74) *Attorney, Agent, or Firm* — Quarles & Brady LLP

(57) ABSTRACT

Disclosed is a device for application of a sticker or decal on a surface difficult to position or align. Also disclosed is a method of using a device for application of a sticker or decal on a surface.

20 Claims, 9 Drawing Sheets

POSITIONING DEVICE AND METHOD FOR VEHICLE STICKERS

CROSS-REFERENCE TO RELATED APPLICATIONS

This application claims the benefit of and priority to U.S. Provisional Application Ser. No. 63/218,627, filed Jul. 6, 2021, the entire contents of which is incorporated by reference herein.

FIELD

The disclosure relates to a device and methods for positioning a sticker or decal on a surface, including a vehicle window.

BACKGROUND

Placement of adhesive decals or stickers on surfaces can be difficult to position or align to the surface, particularly for surfaces that are not flat. For example, surfaces of a vehicle, such as bumpers, windows and front windshields are commonly curved. Applying and aligning a decal to a vehicle or automotive window, for example an inspection sticker, can be especially problematic.

Vehicle inspection stickers are required in many states, and are distributed in a form with the inspection details on a tacky side to adhere to a window. Placing an inspection sticker on an inner surface of a vehicle windshield is often difficult to accomplish due to the curve of the window and limited space between the windshield and instrument panel. Improper alignment and damage to the official sticker often result, and create complications for vehicle owners and inspection service providers. A device that can efficiently and effectively place a decal or sticker in proper alignment is needed to overcome these obstacles.

SUMMARY

Disclosed is a device for positioning a sticker onto a surface. One aspect of the disclosure is a device for positioning at least one sticker onto a surface comprising a handle; a head or top portion having a tack plate, the tack plate having a tack surface with a releasable adhesive disposed thereon; an adjustable connection element connecting the head to the handle such that a position of the tack surface is adjustable relative to the handle.

Another aspect of the disclosure is a method of positioning at least one sticker on a surface of a vehicle, including providing the disclosed device; providing a sticker with one adhesion side; positioning the at least one sticker on the tack surface with the adhesion side of the sticker facing away from the tack surface; positioning the head of the device adjacent the surface of the vehicle; bringing the adhesion side of the at least one sticker into contact with the surface of the vehicle; and moving the head of the device away from the surface of the vehicle.

Other features and advantages of aspects of the disclosure will become apparent from the following more detailed description, taken in conjunction with the accompanying drawings, which illustrate, by way of example, the principles of aspects of the invention.

BRIEF DESCRIPTION OF THE DRAWINGS

The drawings described below are for illustration purposes only and are not intended to limit the scope of the present teachings in any way.

DETAILED DESCRIPTION

Figure 1:
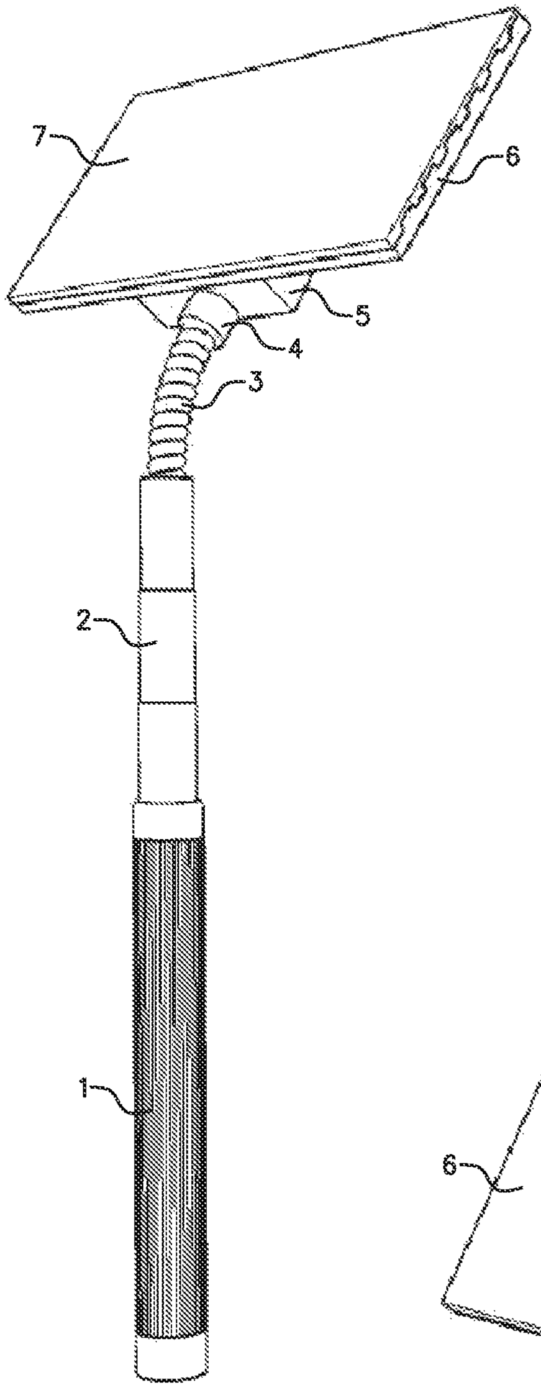
FIG. 1 illustrates a front perspective view of an embodiment of a disclosed positioning device.
Figure 2:
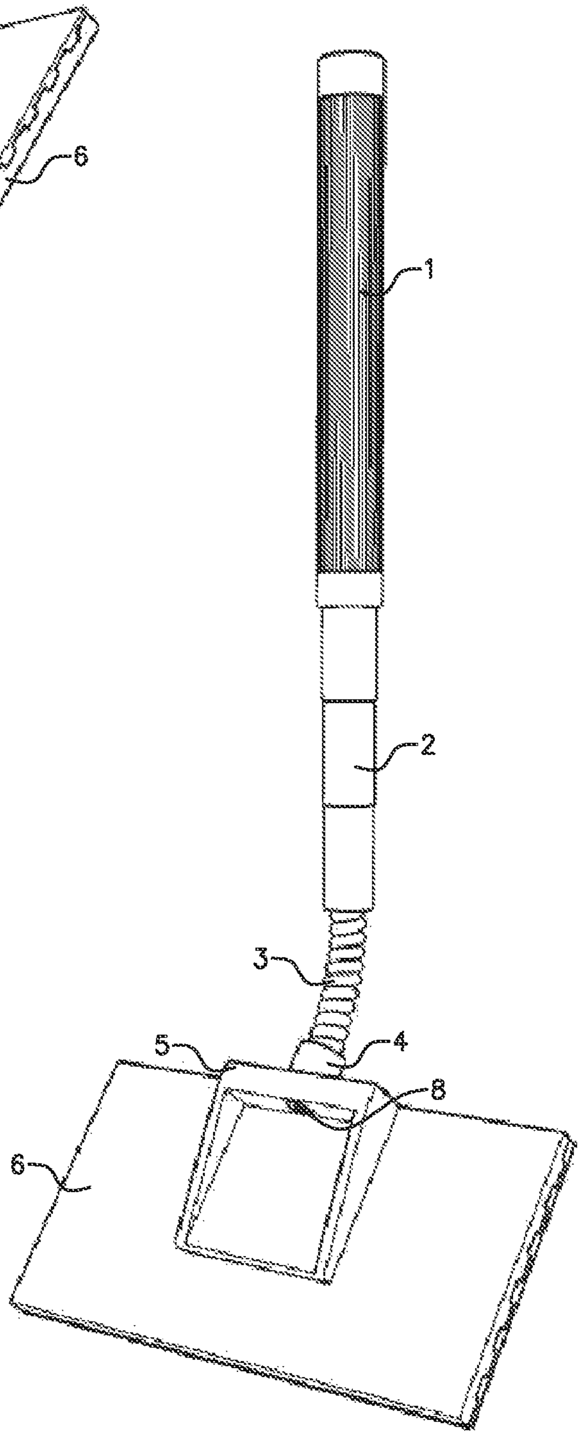
FIG. 2 illustrates a back perspective view of the device of FIG. 1.

It is to be understood that the descriptive embodiments in this disclosure are not limited to particular methods, reagents, compounds, compositions or biological systems, which can, of course, vary. It is also to be understood that the terminology used herein is for the purpose of describing particular embodiments only, and is not intended to be limiting.

Unless defined otherwise, all technical and scientific terms used in this disclosure with the appended claims have the same meaning that is commonly understood by one of ordinary skill in art to which the subject matter pertains. As used in the specification and the appended claims, unless specified to the contrary, the following terms have the meaning indicated to facilitate the understanding of the disclosure.

The terms “a,” “an,” “the” and similar references used in the context of the present disclosure (especially in the context of the claims) are to be construed to cover both the singular and the plural, unless indicated or clearly contradicted by context. All methods described herein can be performed in any suitable order unless otherwise indicated herein or otherwise clearly contradicted by context. The use of any and all examples, or exemplary language (e.g., “such as”) provided herein is intended merely to illuminate the present invention and does not limit the scope of the invention otherwise claimed. No language in the present specification should be construed as indicating any non-claimed element essential to the practice of the invention.

Also as used herein, “and/or” refers to and encompasses any and all possible combinations of one or more of the associated listed items, as well as the lack of combinations when interpreted in the alternative (“or”).

As used herein, the term “comprising” or “comprises” is used in reference to products, methods, and respective component(s) thereof, that are essential to the product or method, yet open to the inclusion of unspecified elements, whether essential or not.

As used herein, the term “sticker” is to be construed to cover a decal, label, and stamp.

As used herein, the term “vehicle” is to be construed to include a car, truck, bus, train, airplane, motorcycle, scooter, mechanized construction equipment, etc.

This disclosure relates generally to a device and method for positioning a sticker in an area difficult to reach. The disclosure relates particularly to a device and method for positioning at least one sticker for a vehicle, such as an inspection sticker that is positioned on an inner surface of a vehicle windshield. The positioning and application of such stickers is often difficult to accomplish due to the limited space between the windshield and instrument panel. The result is often that a sticker is positioned at an angle to horizontal and/or the sticker is partially wrinkled or otherwise damaged. The disclosed device and method allow for proper alignment of a sticker and ease of application in an area difficult to reach.

Disclosed is a device with a handle and tack plate, the tack plate being repositionable with respect to the handle. The device allows a user to position a sticker into a hard-to-reach area. The tack plate has a tack surface with a releasable adhesive on the tack surface for holding a sticker during positioning. One aspect of the disclosure is a device for positioning at least one sticker onto a surface comprising a handle; a head or top portion having a tack plate, the tack plate having a tack surface with a releasable adhesive disposed thereon; an adjustable connection connecting the head to the handle such that a position of the tack surface is adjustable relative to the handle.

FIGS. 1-12 provide various views of a device according to embodiments of the disclosure. Some of the figures include exemplary dimensions. However, embodiments of the present invention are not limited to these dimensions. The figures are also to scale for some embodiments, but further embodiments are not limited to these scale representations.

Figure 3:
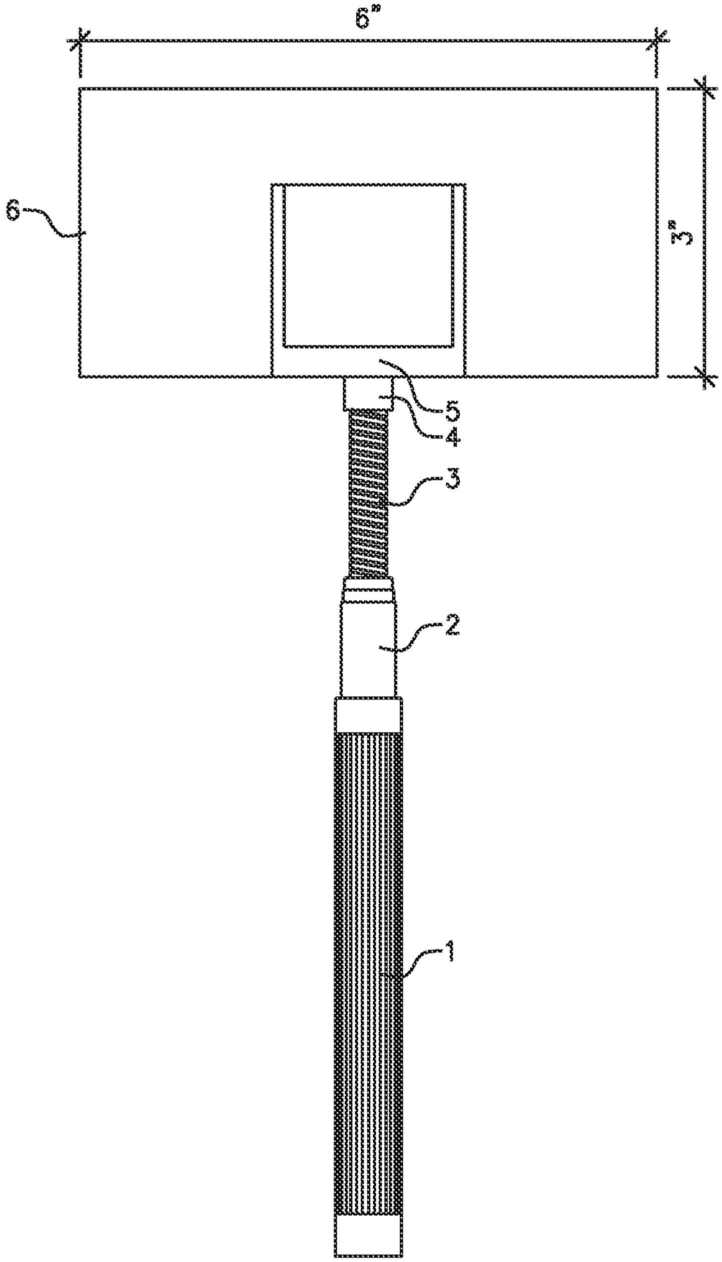
FIG. 3 illustrates a back view of the device of FIGS. 1 and 2.
Figure 4:
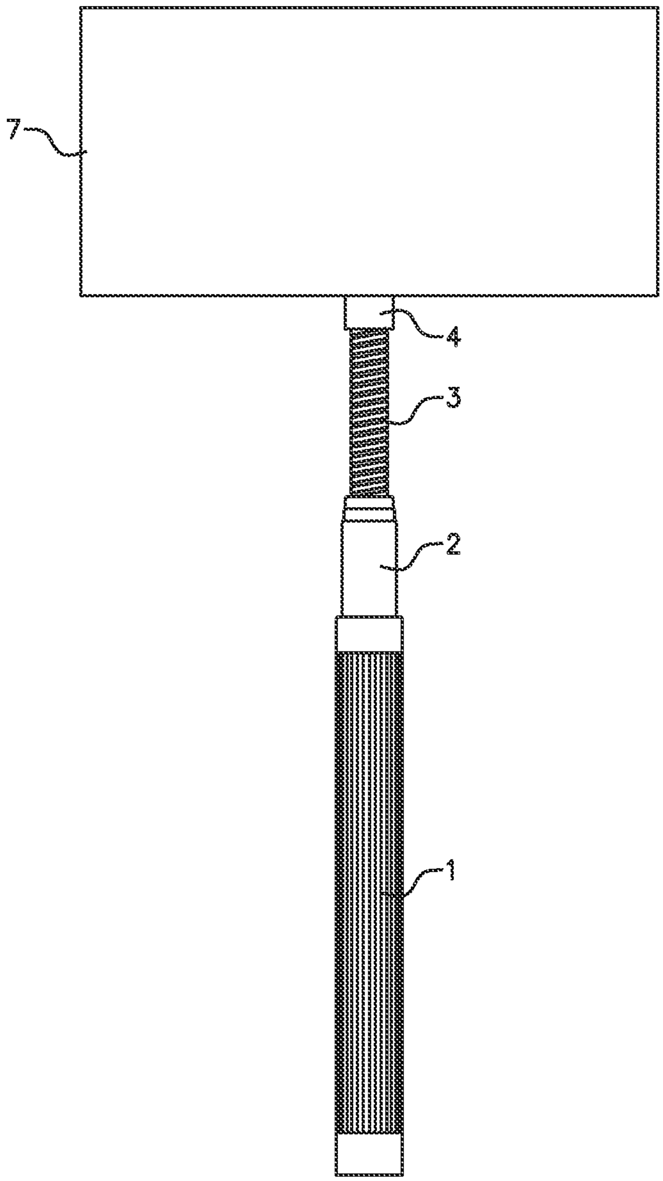
FIG. 4 illustrates a front view of the device of FIGS. 1-3.
Figure 5:
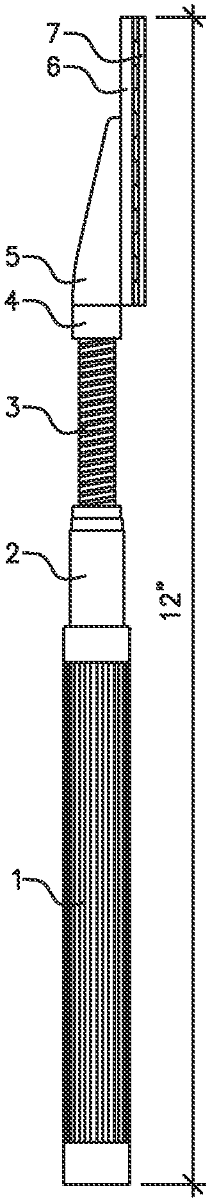
FIG. 5 illustrates a first side view of the device of FIGS. 1-4.
Figure 6:
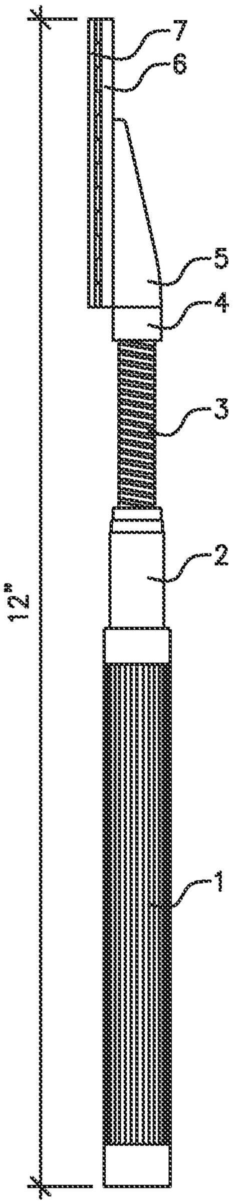
FIG. 6 illustrates a second side view of the device of FIGS. 1-5.
Figure 7:
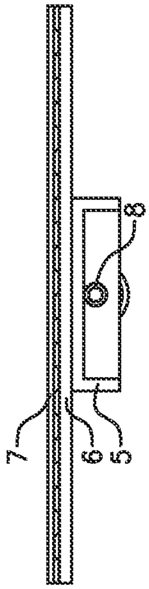
FIG. 7 illustrates a top view of the device of FIGS. 1-6.
Figure 8:
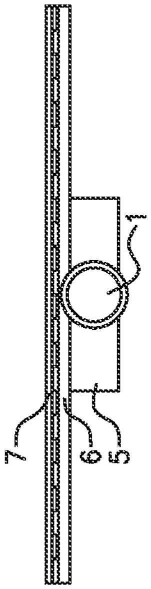
FIG. 8 illustrates a bottom view of the device of FIGS. 1-7.
Figure 9:
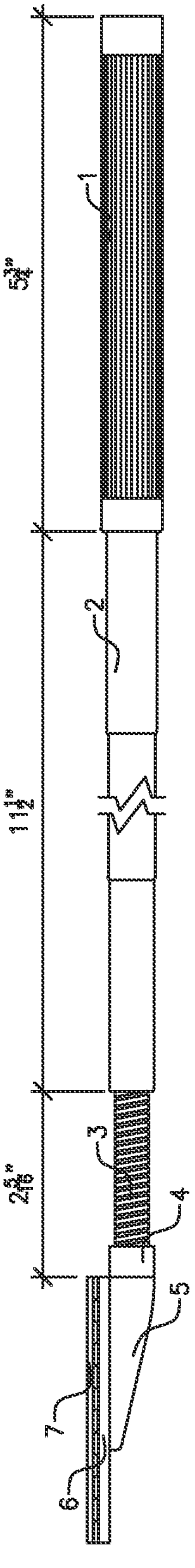
FIG. 9 illustrates a side view with the device in an extended position.
Figure 10:
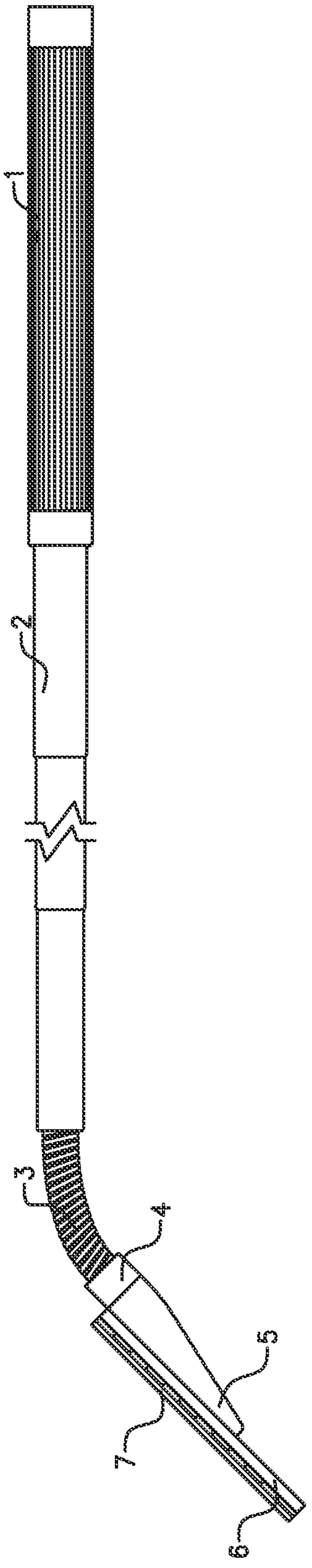
FIG. 10 illustrates a side view of the device with a head of the device in a pivoted position.
Figure 11:
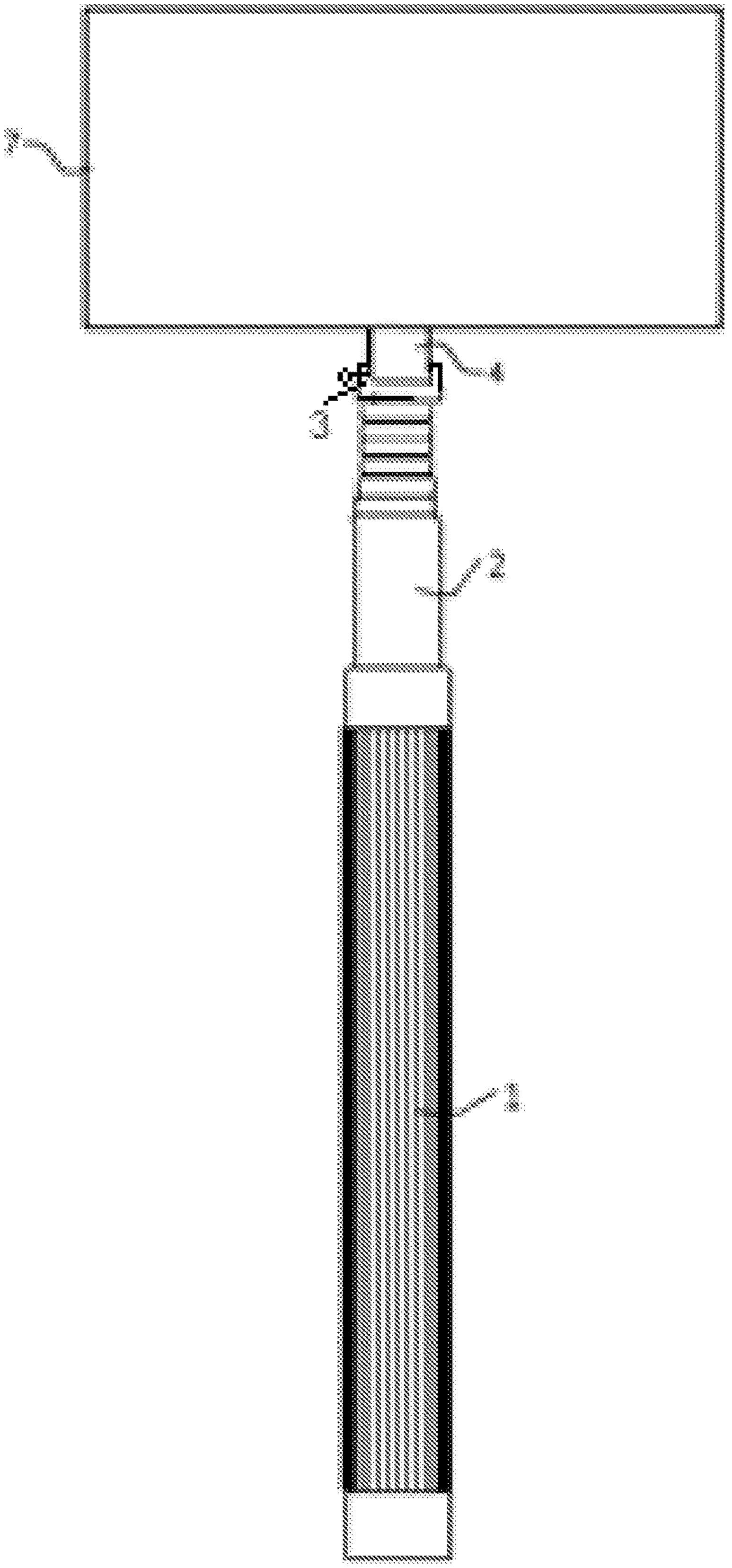
FIG. 11 illustrates a front view of another embodiment of a disclosed positioning device.
Figure 12:
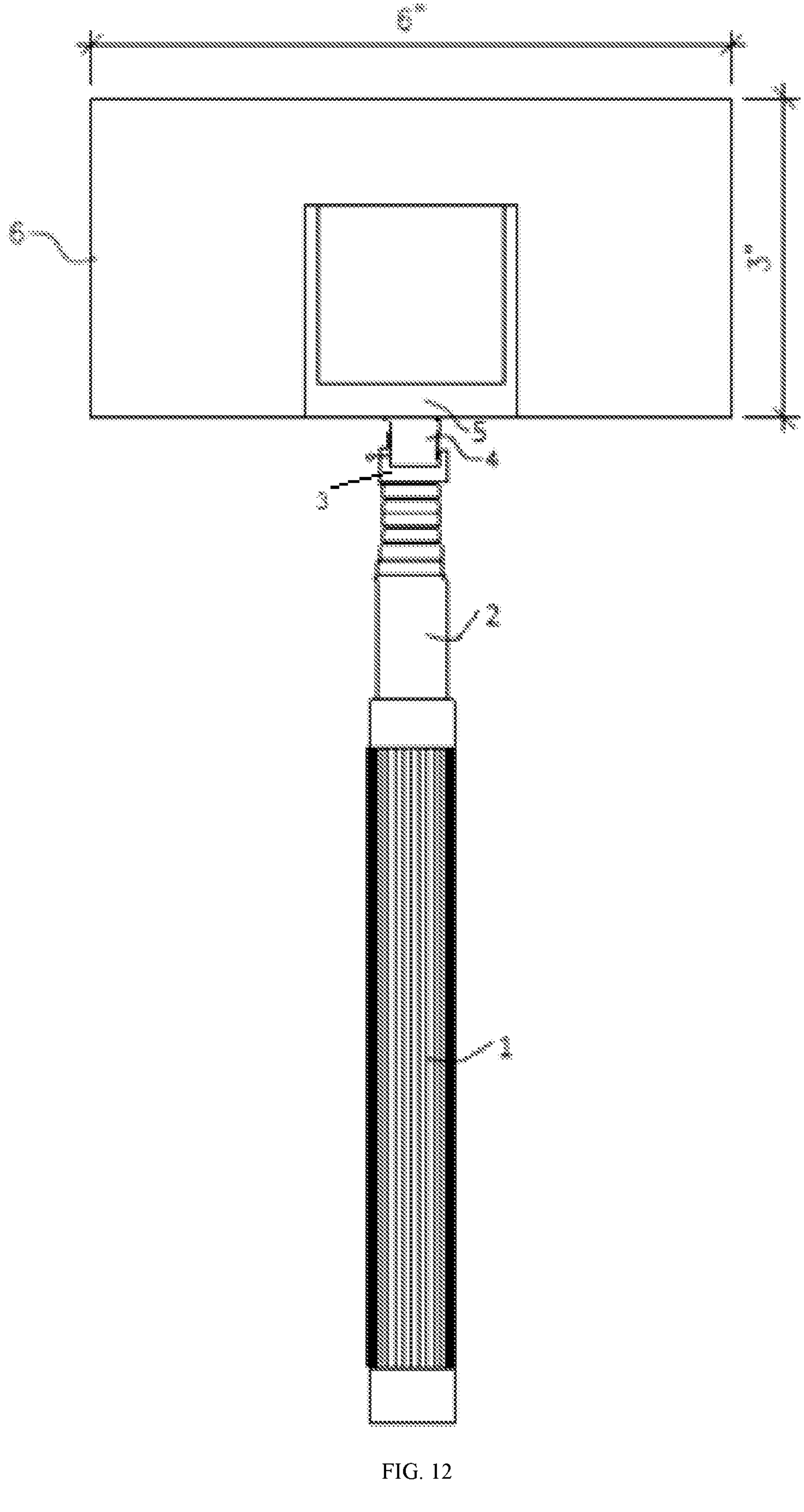
FIG. 12 illustrates a back view of the device of FIG. 11.

Referring to FIGS. 1-12, an illustrated embodiment has a handle 1 defining a proximal end of the device and a tack plate 6 defining the distal end of the device. The tack plate 6 has a mounting head 5, and a tack surface 7. The tack plate 6 has a tack surface 7 permanently attached to the tack plate 6. The tack surface 7 may have a repositionable or releasable adhesive disposed thereon for holding the sticker on the tack surface during positioning. An adjustable connection connects the handle 1 to the tack plate 6. The handle 1 has an extendable shaft 2 at the distal end of the handle. In some embodiments, the extendable shaft 2 may be connected to a flexible, pivotable shaft 3, which may be part of or connected to an adjustable connection element 4 for connection to the tack plate 6. (FIGS. 3 and 4). In some embodiments, the extendable shaft 2 may be connected to a flexible, pivotable or rotatable bolt that may be part of or connected to the adjustable connection element 4 for connection to the tack plate 6. (FIGS. 11 and 12). A mountable head retainer nut 8 connects the mountable head to the adjustable connection element 4. (FIG. 10).

The handle 1 is elongate and preferably constructed from a single piece of material suitable for holding. The handle 1 includes a grip portion that may be round or any other ergonomic shape for comfort and/or gripping power.

In embodiments, the tack plate 6 is formed of a plastic, for example a solid or hard plastic. The tack plate 6 has a width in the range of 2 to 10 inches, preferably 4 to 8 inches, more preferably 5 to 7 inches, such as approximately 6 inches. In embodiments, the tack plate 6 has a length in the range of 2 to 8 inches, preferably 2 to 6 inches, more preferably 2 to 4 inches, such as approximately 3 inches. (FIGS. 3 and 12). The tack plate may be replaceable. The tack plate 6 has a tack surface 7 permanently attached to the tack plate 6, with the tack surface 7 permanently attached to the tack plate 6 on an opposed side of the tack surface 7 from the surface of the tack surface 7 that receives the repositionable or releasable adhesive thereon.

In embodiments, the tack surface 7 has a width in the range of 2 to 10 inches, preferably 4 to 8 inches, more preferably 5 to 7 inches, such as approximately 6 inches. In embodiments, the tack plate 6 has a length in the range of 2 to 8 inches, preferably 2 to 6 inches, more preferably 2 to 4 inches, such as approximately 3 inches. In embodiments, the tack surface 7 may have the same width and length dimensions as the tack plate 6. In some embodiments, the tack surface 7 has a width and/or length that is less than the width and/or length of the tack plate.

The tack surface 7 of the tack plate 6 may take the form of a foam or other compliant layer. The form or other compliant tack surface 7 may be attached to the tack plate 6 with a permanent, non-removable, or non-releasable adhesive. Repositionable adhesive may be applied to the tack surface 7 and/or the material forming the tack surface 7 may contain a repositionable adhesive to render the material tacky, thereby providing an adhesive that releases material adhered to it. A repositionable adhesive may be applied to the tack surface 7 for holding the sticker or decal temporarily on the tack surface 7 by any means, such as spray, roll-on, or spread. The tack surface 7 may also be washable. Any compliant material that may retain a repositionable adhesive for holding a sticker may be used as the tack surface 7, including for example foam, sponge, and felt. In embodiments, the tack surface 7 is foam, such as a foam pad.

The mounting head 5 may be attached to the tack plate by any means, including for example bolt, screw, or rivet. The mounting head 5 has a length of 1 to 3 inches, preferably 2 inches, and a width of 1 to 2 inches, preferably 2 inches.

An adjustable connection element 4 connects the mounting head 5 to the handle 1 and allows the position of the tack surface 7 relative to the handle 1 to be adjusted. The adjustable connection element 4 includes a pivot operable to adjust an angular position of the head relative to the handle. Different elements may be provided as the adjustable connection element. In some embodiments, the pivot comprises a flex shaft or a flex bolt, either labeled 3. In embodiments, the adjustable connection element 4 with the pivotable shaft or bolt is connected to an extendable shaft 2 that is connected to the distal end of the handle 1. In some embodiments, the adjustable connection element 4 is connected to the distal end of a flex shaft 3 that is connected to the distal end of the extendable shaft 2. In some embodiments, the adjustable connection element 4 is connected to or part of a pivotable flex bolt 3 that is connected to the distal end of the extendable shaft 2. In embodiments, the adjustable connection element 4 provides for pivoting of the tack surface 7 relative to the handle 1. In some embodiments, the flex shaft 3 provides for pivoting of the tack surface 7 relative to the handle 1.

FIGS. 1-6 and 11-12 illustrate the device with the extendable shaft 2 retracted. FIGS. 9 and 10 illustrate the device with the extendable shaft 2 extended. Further, FIG. 10 illustrates the flex shaft 3 flexed to provide an angle between the handle 1 and the tack surface 7.

The device has an overall length, from a proximal end of the handle to a distal end of the head, in the range of 8 to 48 inches. The overall length is adjustable by the extendable shaft 2. The overall length between a retracted length is in the range of 8 to 18 inches and an extended length between 18 and 48 inches. The overall length of the extendable shaft 2 is from 20 to 40 inches, preferably from 20 to 32 inches.

Another aspect of the disclosure is a method of positioning at least one sticker on a surface, such as on a vehicle, or vehicle window using the device disclosed herein. An embodiment is a method of positioning at least one sticker on a surface including providing at least one sticker with one adhesion side; positioning the at least one sticker on the tack surface with the adhesion side of the sticker facing away from the tack surface; positioning the tack plate with the tack surface of the device adjacent the surface of the vehicle; bringing the adhesion side of the at least one sticker into contact with the surface of the vehicle; and moving the device away from the surface of the vehicle. In embodiments, following moving the device away from the surface of the vehicle, the at least one sticker is positioned and properly aligned on the surface of the vehicle.

In embodiments, the surface of the vehicle may be any surface. In some embodiments, the vehicle surface is a bumper, window, or windshield. In embodiments in which the sticker is an inspection sticker, the surface is a windshield.

In embodiments, repositionable adhesive may be applied to the tack surface 7 and/or the material forming the tack surface 7 may contain a repositionable adhesive to render the material tacky, thereby providing an repositionable adhesive that releases material adhered to it. In embodiments, the method further comprises applying a repositionable adhesive to the tack surface 7 for holding the sticker or decal temporarily on the tack surface 7. In some embodiments, the repositionable adhesive is applied by spraying, rolling, or spreading on the tack surface 7.

The method using the disclosed device provides for aligning in a proper position at least one sticker on the surface of a vehicle, the method including obtaining the tack surface of a tack plate with the tack surface containing a repositionable adhesive, placing at least one sticker having one adhesion side onto the tack surface with the adhesion side of the sticker facing away from the tack surface, positioning the tack plate with the tack surface of the device adjacent to the surface of the vehicle and aligned to place the sticker in a desired place; and bringing the adhesion side of the at least one sticker into contact with the surface of the vehicle, thereby placing the sticker in the desired position and alignment. For a surface of the vehicle that is not flat, such as a curved windshield, the disclosed device efficiently brings the adhesion side of the sticker into contact with the surface of the vehicle to adhere the sticker to the surface. The repositionable glue holding the sticker to the tack surface allows for ease of moving the device away from the surface of the vehicle and the adhered sticker without damaging the sticker or its position on the surface. In embodiments, following moving the device away from the surface of the vehicle, the at least one sticker is positioned and properly aligned on the surface.

As will be clear to those of skill in the art, the disclosed device may be altered in various ways without departing from the scope or teaching of the disclosure. For example, the present invention is not limited to automotive windshields or to inspection stickers. The device and method may also be used for stickers or labels for boats and other vehicles and may be used on other surfaces such as rear, side or other windows.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

We claim:

1. A device of positioning at least one sticker onto a surface, the device comprising: a handle;

a tack plate, the tack plate having a tack surface with a releasable adhesive disposed thereon;

a mounting head connecting the tack plate to the handle;

an adjustable connection element connected to the mounting head such that a position of the tack surface is adjustable relative to the handle; and an extendable shaft operable to adjust a distance between the handle and the tack plate.

2. The device of claim 1, wherein the extendable shaft is connected to the adjustable connection element and the handle.

3. The device of claim 1, wherein the adjustable connection element is connected to a pivot operable to adjust an angular position of the tack plate relative to the handle.

4. The device of claim 3, wherein the pivot comprises a flex shaft.

5. The device of claim 3, wherein the pivot comprises a flex bolt.

6. The device of claim 1, wherein the tack plate comprises a foam material having a surface defining the tack surface.

7. The device of claim 1, wherein the tack surface has a width in the range of 2 to 10 inches.

8. The device of claim 1, wherein the device has an overall length, from a proximal end of the handle to a distal end of the head, in the range of 8 to 48 inches.

9. The device of claim 8, wherein the overall length is adjustable between a retracted length in the range of 8 to 18 inches and an extended length between 18 and 48 inches.

10. A method of positioning at least one sticker on a surface of a vehicle, the method comprising:

providing a device according to claim 1;

providing at least one sticker with an adhesion side;

positioning the at least one sticker on the tack surface with the adhesion side of the sticker facing away from the tack surface;

positioning the head of the device adjacent the surface of the vehicle;

bringing the adhesion side of the sticker into contact with the surface of the vehicle; and moving the device away from the surface of the vehicle.

11. The method of claim 10, wherein the extendable shaft is extended.

12. The method of claim 10, wherein the extendable shaft is connected to the adjustable connection element and the handle.

13. The method of claim 10, wherein the adjustable connection element is connected to a pivot operable to adjust an angular position of the tack plate relative to the handle.

14. The method of claim 13, wherein the pivot comprises a flex shaft.

15. The method of claim 13, wherein the pivot comprises a flex bolt.

16. The method of claim 10, wherein the tack plate comprises a foam material having a surface defining the tack surface.

17. The method of claim 10, wherein the at least one sticker is properly aligned on the surface of the vehicle.

18. The method of claim 10, wherein the surface of the vehicle is a windshield or window.

19. The device of claim 1, wherein the tack surface has a length in the range of 1 to 8 inches.

20. The device of claim 1, wherein the tack surface has a width of 6 inches and a length of 3 inches.

* * * * *